Figure 1:
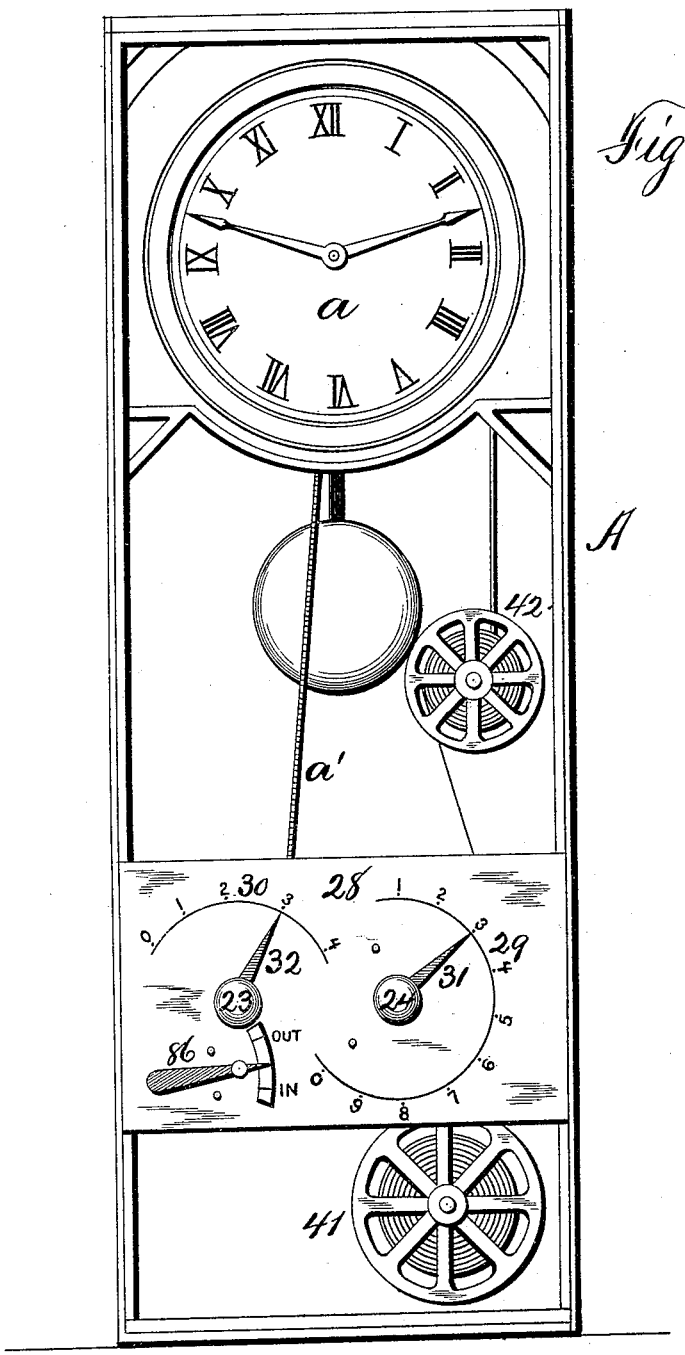

(No Model.)

W. LE G. BUNDY.
WORKMAN'S TIME RECORDER.

10 Sheets—Sheet 1.

No. 552,232.

Patented Dec. 31, 1895.

WITNESSES:
Chas. W. Marvin.
J. T. Hildreth

INVENTOR
Willard L. Bundy
BY
Smith & Denison
his ATTORNEYS.

(No Model.) 10 Sheets—Sheet 2.

W. LE G. BUNDY.
WORKMAN'S TIME RECORDER.

No. 552,232. Patented Dec. 31, 1895.

WITNESSES:
Charles W. Marvin.
J. T. Hildreth

INVENTOR
Willard L. Bundy
BY
Smith & Denison
his ATTORNEYS.

(No Model.) W. LE G. BUNDY. 10 Sheets—Sheet 3.
WORKMAN'S TIME RECORDER.
No. 552,232. Patented Dec. 31, 1895.

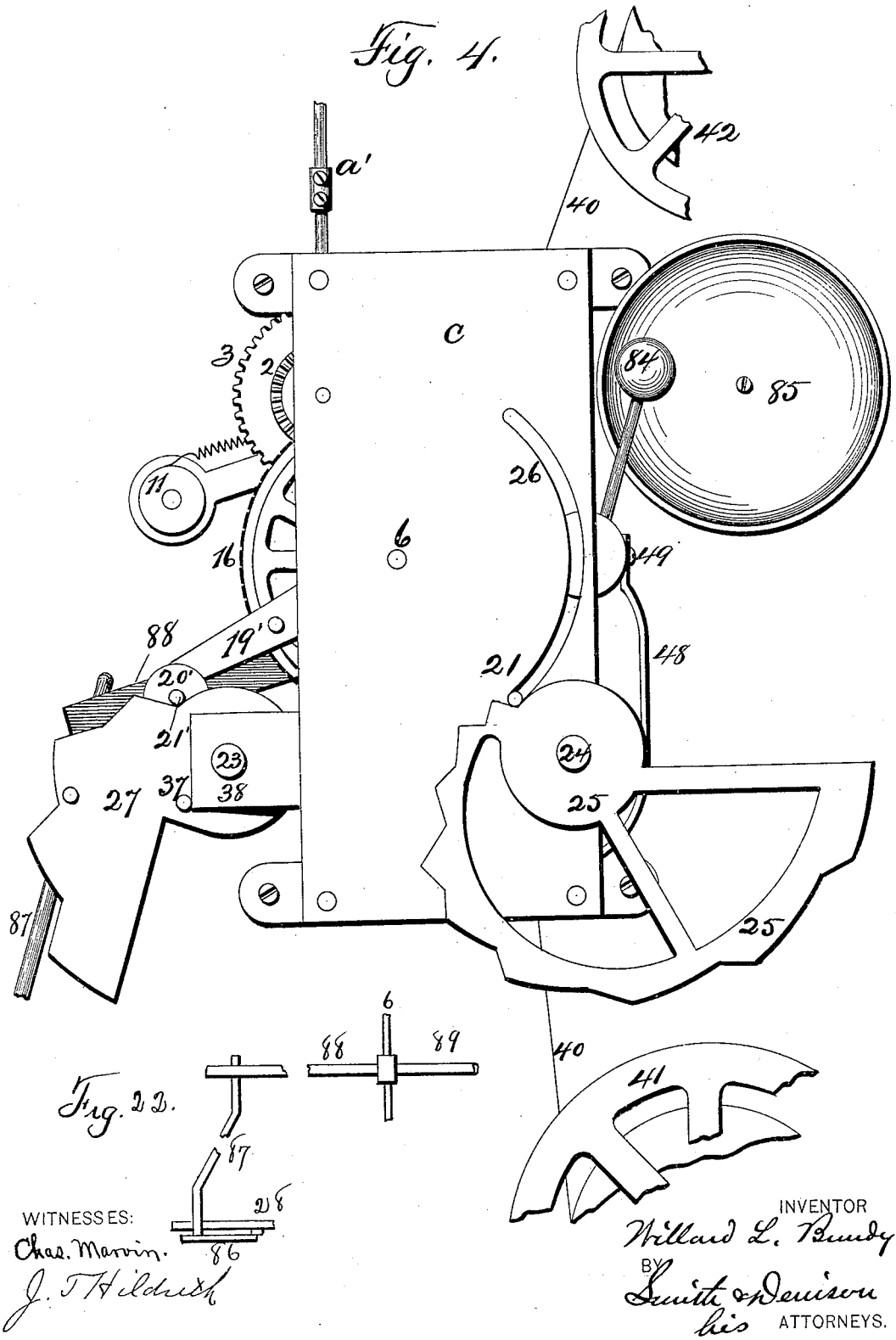

(No Model.) 10 Sheets—Sheet 5.
W. LE G. BUNDY.
WORKMAN'S TIME RECORDER.
No. 552,232. Patented Dec. 31, 1895.
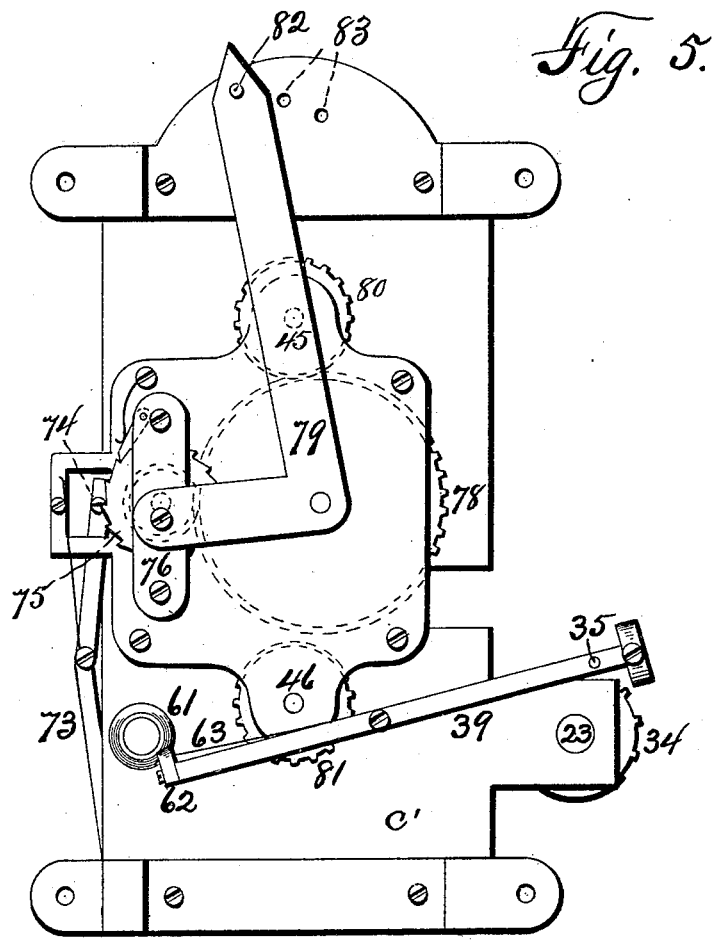
Fig. 5.
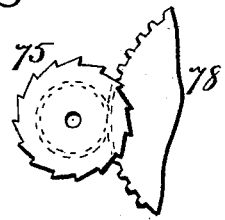
Fig. 5.a.
Fig. 5.b.
WITNESSES:
Chas. W. Marvin
J. T. Hildreth
INVENTOR
Willard L. Bundy
BY Smith & Denison
his ATTORNEYS.

(No Model.)

W. LE G. BUNDY.
WORKMAN'S TIME RECORDER.

No. 552,232. Patented Dec. 31, 1895.

10 Sheets—Sheet 6.

WITNESSES:
Chas. W. Marvin.
J. T. Hildreth

INVENTOR
Willard L. Bundy
BY Smith & Davison
his ATTORNEYS.

(No Model.) 10 Sheets—Sheet 7.
W. LE G. BUNDY.
WORKMAN'S TIME RECORDER.
No. 552,232. Patented Dec. 31, 1895.
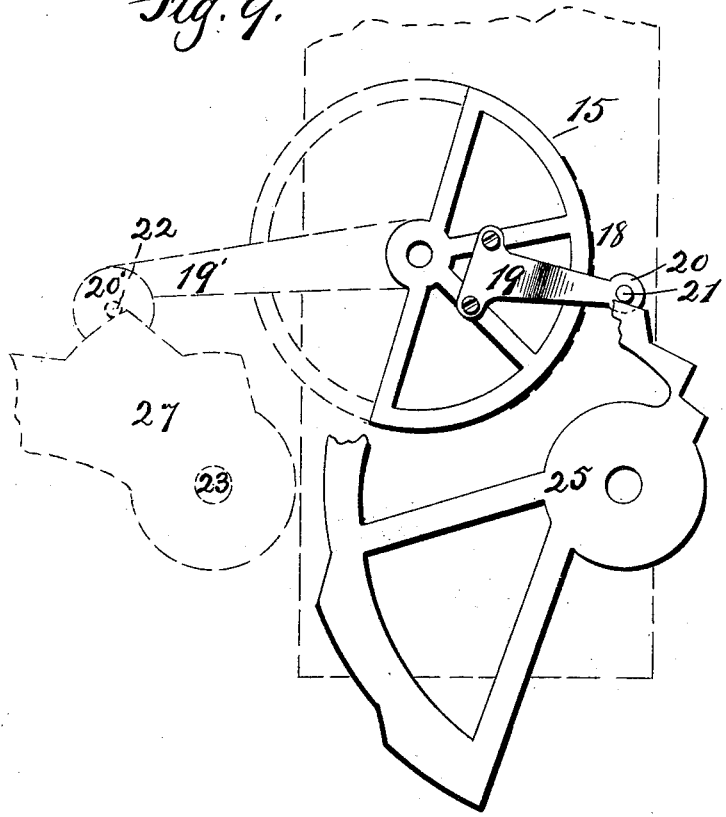
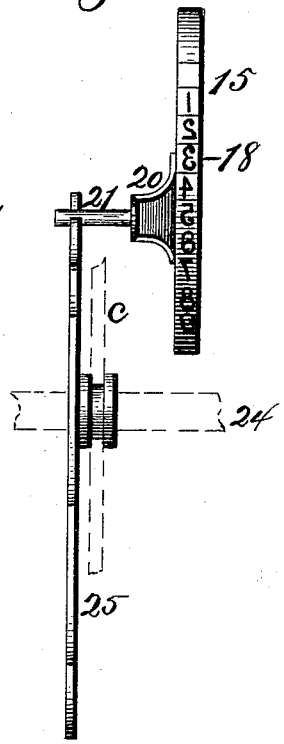
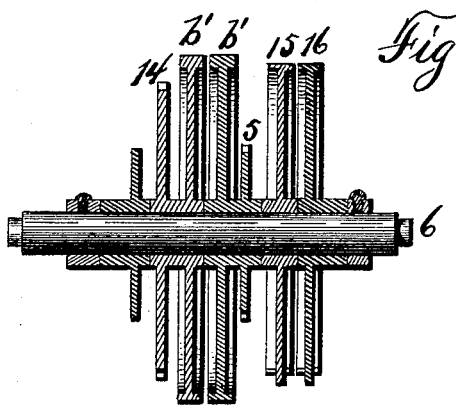
WITNESSES:
Chas. W. Marvin.
J. T. Hildreth
INVENTOR
Willard L. Bundy
BY
Smith & Denison
his ATTORNEYS.

(No Model.) 10 Sheets—Sheet 8.
W. LE G. BUNDY.
WORKMAN'S TIME RECORDER.
No. 552,232. Patented Dec. 31, 1895.
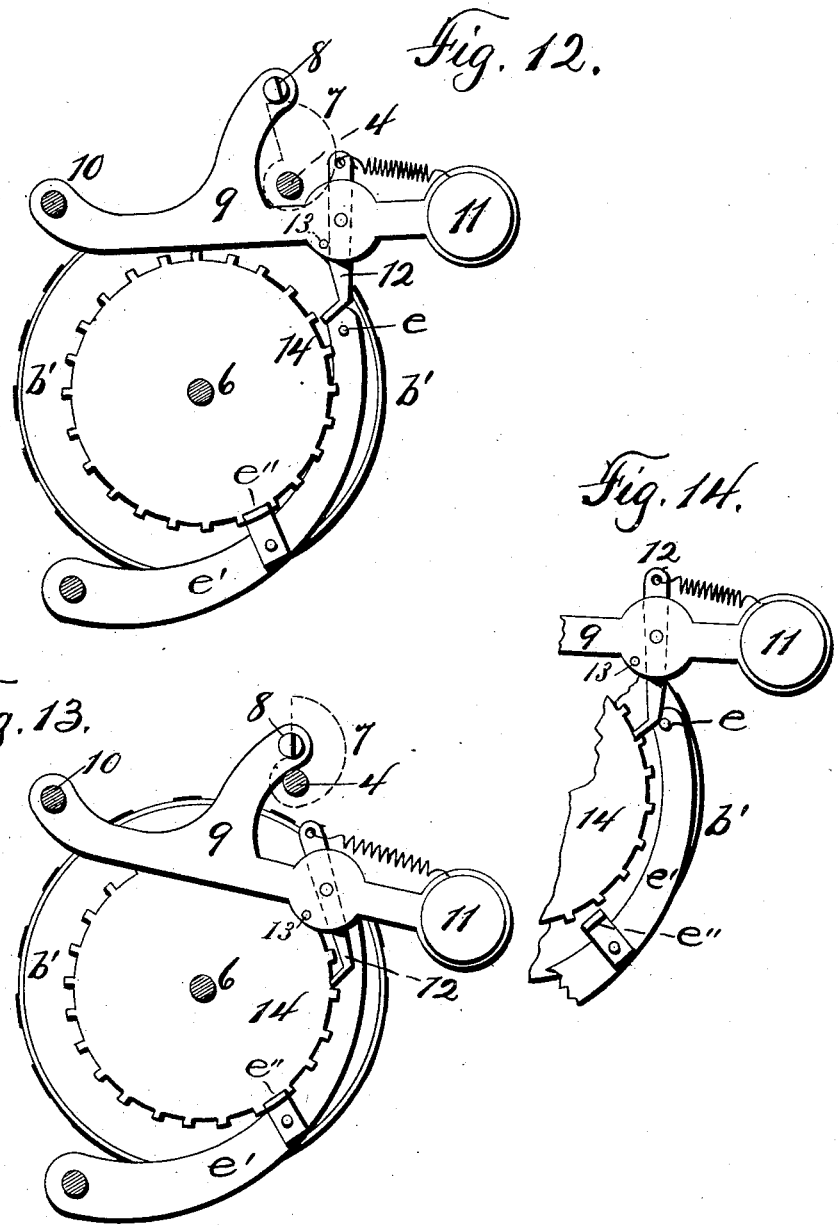
WITNESSES:
Chas. W. Marvin
J. T. Hildreth
INVENTOR
Willard L. Bundy
BY
Smith & Denison
his ATTORNEYS.

(No Model.) 10 Sheets—Sheet 9.

W. LE G. BUNDY.
WORKMAN'S TIME RECORDER.

No. 552,232. Patented Dec. 31, 1895.

WITNESSES:
Charles W. Morvin.
J. T. Hildreth

INVENTOR
Willard L. Bundy
BY
Smith & Denison
his ATTORNEYS.

ANDREW B. GRAHAM, PHOTO-LITHO, WASHINGTON, D.C.

(No Model.) 10 Sheets—Sheet 10.

W. LE G. BUNDY.
WORKMAN'S TIME RECORDER.

No. 552,232. Patented Dec. 31, 1895.

WITNESSES:
Jesse E. Murray
E. S. Borst

INVENTOR
Willard L Bundy
BY
Smith & Denison
his ATTORNEYS.

UNITED STATES PATENT OFFICE.

WILLARD LE GRAND BUNDY, OF BINGHAMTON, NEW YORK, ASSIGNOR TO THE BUNDY MANUFACTURING COMPANY, OF SAME PLACE.

WORKMAN'S TIME-RECORDER.

SPECIFICATION forming part of Letters Patent No. 552,232, dated December 31, 1895.

Application filed December 8, 1893. Serial No. 493,120. (No model.)

*To all whom it may concern:*

Be it known that I, WILLARD LE GRAND BUNDY, of Binghamton, in the county of Broome, in the State of New York, have invented new and useful Improvements in Workmen's Time-Recorders, of which the following, taken in connection with the accompanying drawings, is a full, clear, and exact description.

My invention relates to workmen's time-recorders, by means of which a workman can himself record the time of his entrance into or departure from the factory, each workman being designated and known by a number or numeral, and to that class of recorders in which each workman sets the numeral-printing mechanism for his particular number, prior to performing the act of printing said number upon the paper tape.

My object is to produce a recorder which is provided with separate decimal-setting systems or units and tens, each adapted to be set separately and independently of the other, in order to set it at any unit alone, or at any ten in conjunction with a naught, or any unit, and so on, to produce any number desired; in which by setting for the unit a number wheel or segment is set so as to bring the unit upon the printing-line, and the tens wheel or segment is set so as to bring the ten upon the printing-line, and so on until the numerals upon the periphery of each wheel or segment, when read transversely, indicate the number desired; in which the time-wheels, which are connected to a clock-movement, indicate upon said printing-line the same time, hour and minute, as that indicated by the hands upon the clock-dial; in which the printing or impression of the number of the workman and the numerals of the hour and minute are simultaneously made upon a paper tape, through an ink-ribbon between it and said numerals and number, by means of an impression-platen thrown away therefrom by means of a push-cam and then released and thereafter spring-actuated to strike the impression-blow; in which the oscillation of the platen-arm and the rock-shaft upon which it is mounted, through an arm on said shaft, actuates the paper-feed and also the ribbon-feed; in which the minute-wheel is at all times synchronous with the clock-movement; in which the hour-wheel is automatically shifted hourly, without any intermediate rotation; in which the ribbon-feed is reversible, so that when the ribbon on one spool is more or less unwound that spool is converted into the wind-up spool, while the ribbon is unwound from the other; in which the units and tens wheels are each set by means of independent and rotatable stepped cams, each cam being of increasing radius as the steps respectively indicate the successive numerals from 0 to 9; and in which the number-wheels are automatically released after an impression is made from either or both of them, and are automatically rerotated back to their normal position, ready for resetting by the next workman who comes along.

My invention consists in the several novel features of construction and operation hereinafter described, and which are specifically set forth in the claims hereunto annexed.

It is constructed as follows, reference being had to the accompanying drawings, in which—

Figure 2:
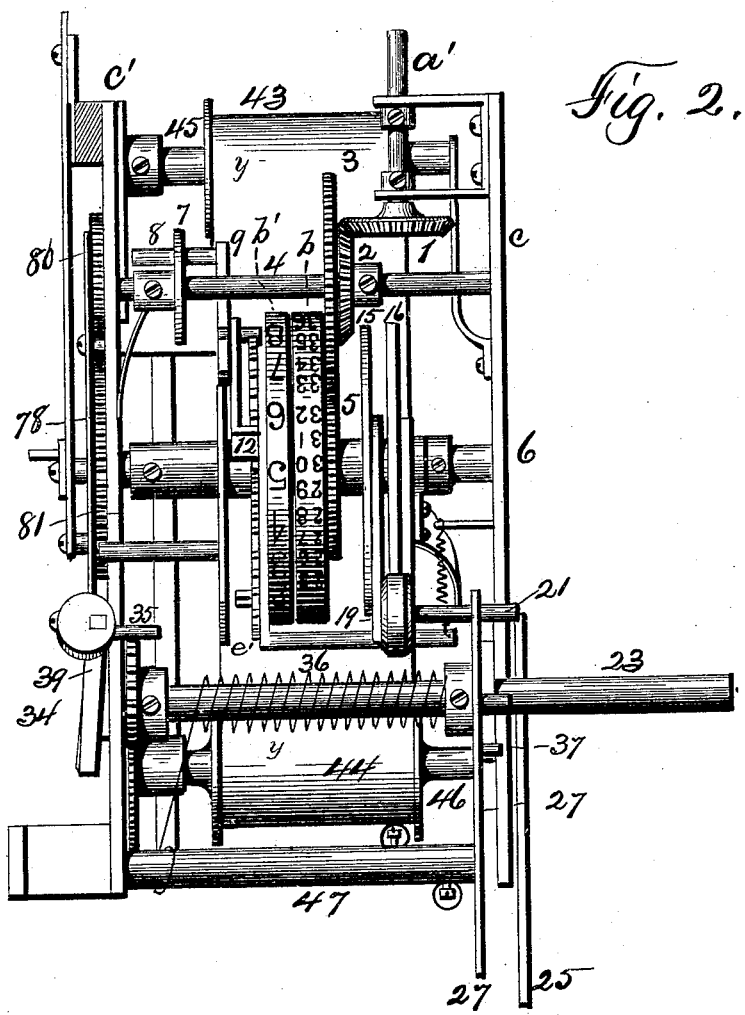
Figure 20:
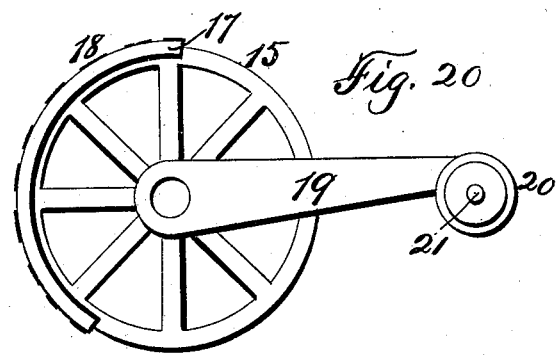
Figure 3:
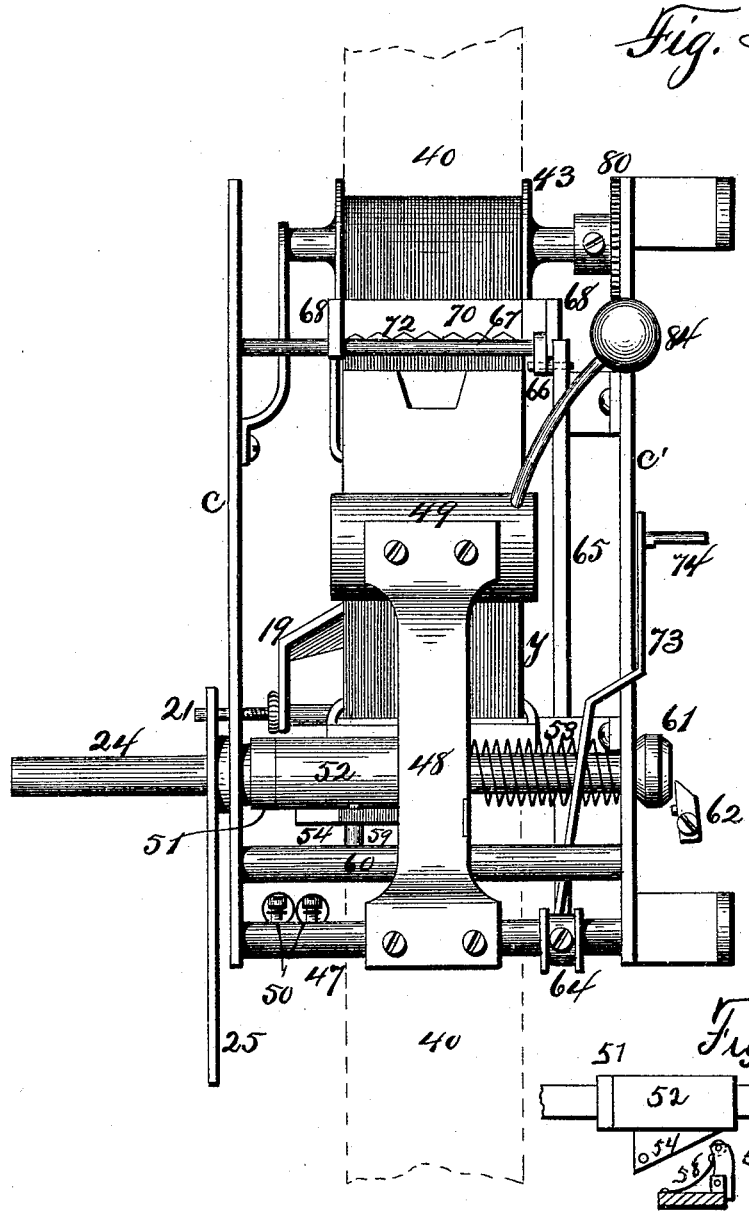
Figure 21:
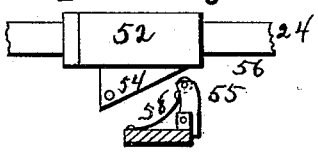
Figure 8:
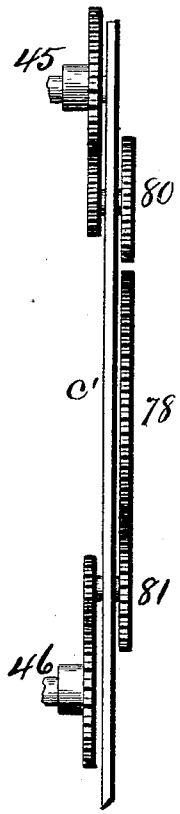
Figure 6:
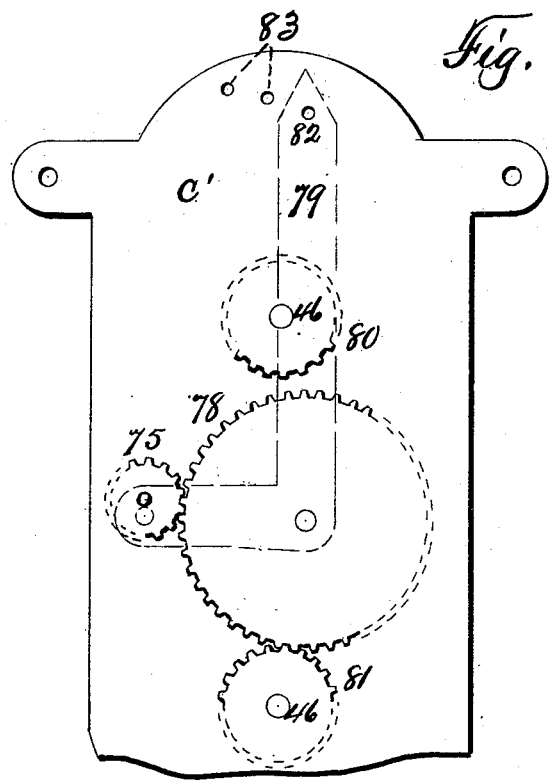
Figure 7:
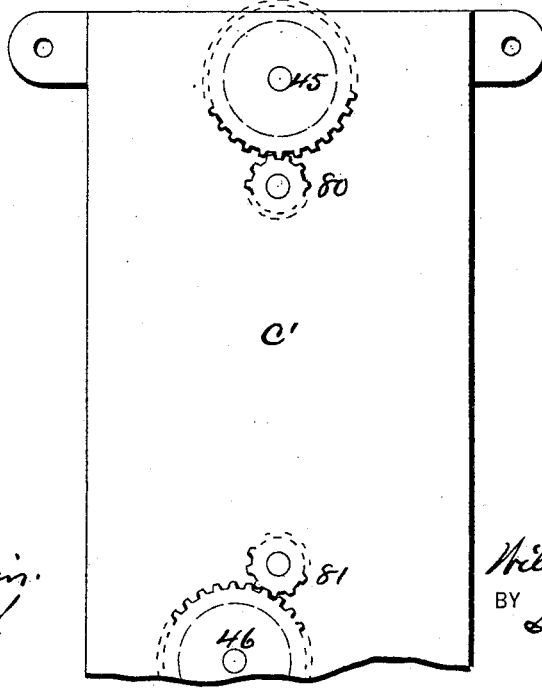
Figure 15:
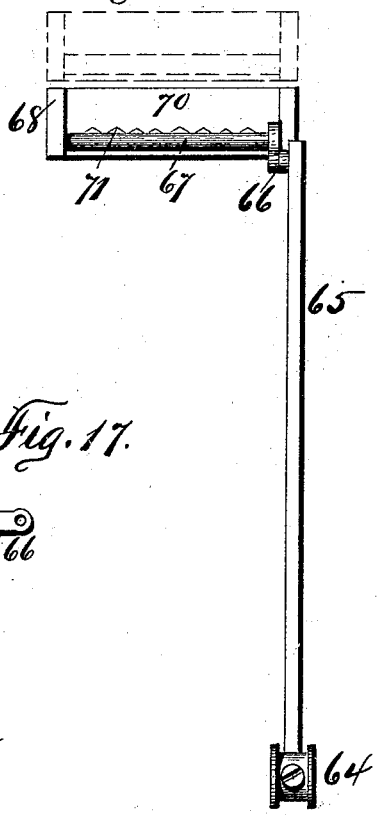
Figure 16:
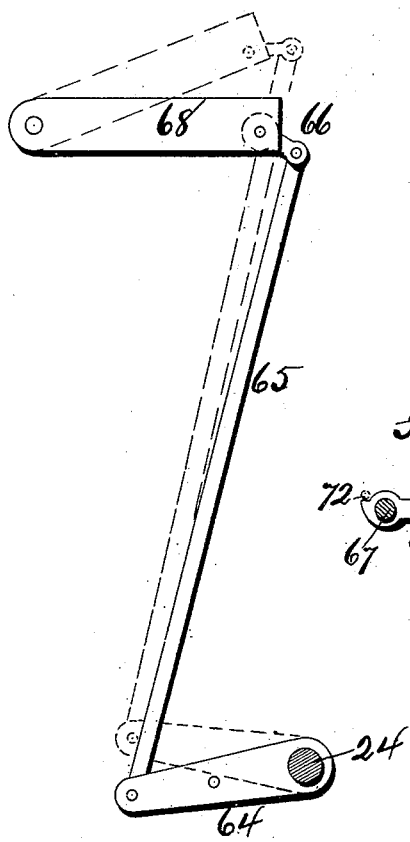
Figure 17:
Figure 18:
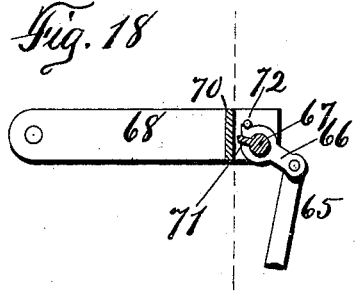
Figure 19:
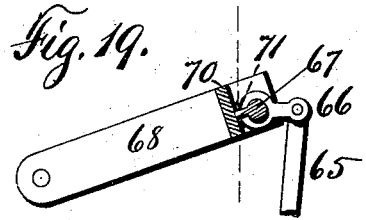
Figure 23:
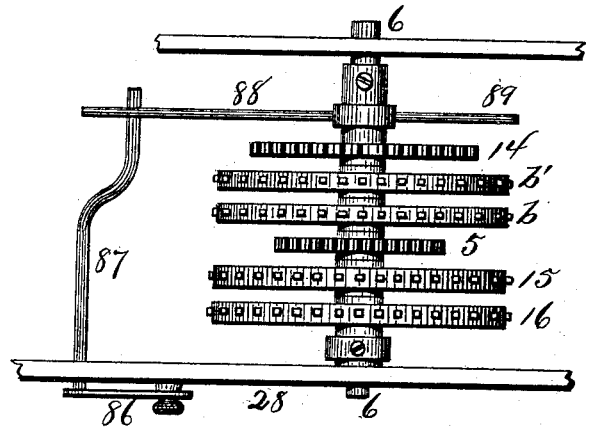
Figure 24:
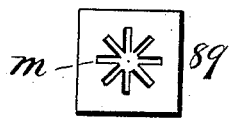
Figure 26:
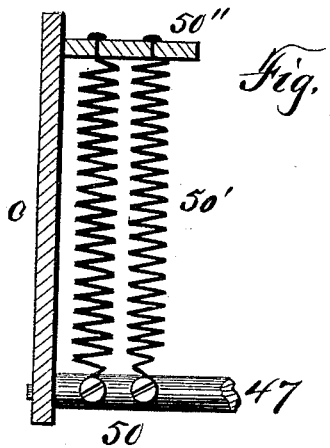
Figure 25:
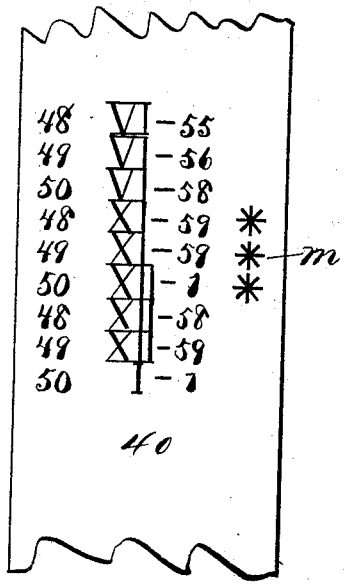

Figure 1 is a front elevation of the recorder with the door removed. Fig. 2 is a side elevation of the recording mechanism. Fig. 3 is a like view of the opposite side of the same. Fig. 4 is a front elevation of the same with the dial-plate removed. Fig. 5 is a rear elevation of the same, showing the ribbon-feed mechanism set to rotate the upper ribbon-spool. Figs. 5ª and 5ᵇ are details of the ribbon-feed ratchet and gears actuated thereby. Fig. 6 is a like view of the same, showing this mechanism set to rotate the lower ribbon-spool. Fig. 7 is a front elevation of the back plate, showing the pinions actuated by the mechanism shown in Figs. 5 and 6, and the driven gears upon the spool-shafts. Fig. 8 is an edge elevation of the back plate. Fig. 9 is a front elevation of the units-segment and its stepped cam, also showing the tens stepped cam and the bar connecting it to the tens-segment in dotted lines. Fig. 10 is a side elevation of the same. Fig. 11 is a vertical elevation of the units and tens segments, the time-wheels, and the gears or ratchets for actuating them and the arbor upon which all are mounted or journaled side by side. Fig. 12 is a side elevation of the hour-wheel, the ratchet-and-pawl mechanism for actuating it, and the cam for actuating, lifting, the actuating-lever, and the stop mechanism, showing said lever and pawl raised. Fig. 13 is a like view of the same, showing the lever dropped and the hour-wheel shifted and locked by the stop. Fig. 14 is a like view of part of the hour-wheel, the ratchet and pawl, the lever, and the stop, showing the stop disengaged from the ratchet by the lifting of the lever to bring the pawl into engagement with another tooth of the ratchet preparatory for the shifting of the hour-wheel by its partial rotation. Fig. 15 is a front elevation of the paper-feed mechanism. Fig. 16 is a side elevation of the same, the dotted lines indicating the positions assumed by the parts when operated to draw and feed the paper. Fig. 17 is an elevation of the dog which limits the feed. Fig. 18 is a sectional elevation of the feed-frame, its table, the feed-dog, the feed-grip opened, and part of the connecting-rod, the dotted line indicating the paper. Fig. 19 is a like view of the same parts, showing the feed-frame raised and the feed-grip in engagement, the dotted line indicating the paper. Fig. 20 is a side elevation of the tens-segment and its arm detached. Fig. 21 is a top plan of the cam-shaft, the cam thereon, and the detent on the platen-arm. Fig. 22 is a detail of the mechanism for throwing an indicator onto the printing-line to print an additional character to indicate the exit of the workman. Fig. 23 is a detail, in top plan, of the number and time wheels, the minute-gear, the hour-ratchet, and the mechanism for printing the additional character upon the paper strip. Fig. 24 is an enlarged front elevation of a character, sign, or symbol which can be used. Fig. 25 is a plan of part of a paper strip, as printed, showing part of the records thereon without the additional character and the others with it. Fig. 26 is a sectional detail showing the springs connected to the rock-shaft upon which the platen is mounted, and which actuate it to strike an impression below.

A is the case, in which a clock $a$ is placed, and $a'$ is the shaft rotatably connected to the clock, by which the time of the clock, hour and minute, is transmitted to the time-wheels $b\ b'$, the former being the minute-wheel and the latter the hour-wheel, each being provided with numerals upon its periphery.

A gearing system, comprising the bevel-gear 1 on the shaft $a'$, the bevel-gear 2 and the spur-gear 3, secured upon the arbor 4, which is journaled in the front plate $c$ of the recording mechanism, and in the back plate $c'$ thereof, and the gear 5 loosely mounted upon the arbor 6 and integral with or secured to the minute-wheel $b$ rotates this wheel, so that it is always synchronous with the minute-hand of the clock.

The hour-wheel is intermittently rotated step by step—that is to say, hourly, as the hours are successively reached—but it is not moved or shifted at any period of the time between any two hours. This is done by the following mechanism, Figs. 12, 13, 14, also Fig. 2: The hour-cam 7 is secured upon and rotated by the shaft 4, in frictional contact with the pin 8, projecting from the shifting-bar 9, one end of which is pivoted upon a bar 10 mounted in the front and back plates; said shifter being provided with a weight 11 on its free end, and 12 is a spring-controlled push-pawl pivoted upon said shifter, and 13 is a stop-pin, with which said pawl engages, when the point of the pawl is out of engagement with the ratchet 14, secured or directly connected to the hour-wheel, all so that the rotation of said cam will lift the shifter until the pin reaches the extreme point of the cam, the pawl in the meantime snapping from one ratchet-tooth to another, until when the shifter is released the weight thereof or thereon will cause it to drop, and the push-pawl will rotate the hour-wheel one space and change the numeral then in presentation, as from 5 to 6 in Fig. 2. When the pawl descends it engages with the pin $e$ upon the swinging arm $e'$ and throws the stop $e''$ out of engagement with the ratchet, which rotates until the pawl passes the pin, when a spring (not shown) throws the stop back into engagement and stops the ratchet against movement either way.

I can also apply a similar cam mechanism to the minute-wheel to intermittently rotate it, so that the intermittent rotation of either the hour or the minute wheel, or both, will always present a single numeral at the printing-line, and not parts of two numerals, as would occur if the rotation was continuous, while changing from one hour or minute numeral to the succeeding one.

The workman's number-printing wheels are constructed as follows: These wheels 15 16, (or segments) as shown in Fig. 20, are each provided with a flange 17, and the numbers 18 are secured upon the periphery, and they are loosely mounted upon the shaft 6 and are of equal radius with the time-wheels. The wheel 15 is provided with an arm 19 and a weight 20, the pin 21 being secured in the weight of the tens-wheel or segment 15, the wheel 16, having an arm 19', the weight 20' and the pin 22 mounted in this weight. These number-wheels are set as follows, Figs. 2, 4, and 9: Shafts 23 and 24 are mounted in the front and back plates, the shaft 23 rotatably and the shaft 24 rotatably and so as to be reciprocated. A stepped cam 25 is mounted on the shaft 24, and this cam is divided by notches or otherwise into ten spaces and is hereafter known as the "units-cam," said cam being in engagement with the units-wheel pin 21, so that when said cam is rotated by the rotation of the shaft 24 said pin will traverse the slotway 26 in the front plate, and each time it enters a step-notch in the cam the units-wheel will, by its rotation, present the unit on the wheel corresponding to the step on the cam with which the pin is then in engagement.

A stepped cam 27 is secured on the shaft 23 in engagement with the pin 21', so that the turning of said shaft swings the cam and sets this cam at the figure or numeral desired, and this cam indicates the tens. These shafts 23 24 extend outward through the plate 28, Fig. 1, which is provided with the scales 29 for units and 30 for tens, and 31 is a units-pointer secured onto the shaft 24, and 32 is a tens-pointer secured onto the shaft 23, and, as shown in Fig. 1, these pointers are set to indicate the numeral 33, the cams having been respectively and separately set to indicate it.

*Cam-locking mechanisms*, (Figs. 2 and 5.)— Each and every time the tens-cam for any tens-numeral is set it is automatically locked in its position as set, until the number has been printed onto the paper-tape, as hereinafter described. A ratchet-wheel 34 is secured onto the shaft 23, and when the shaft is turned it is rotated also, and a detent-pin 35 will successively engage with the ratchet-teeth, and hold the shaft and cam against being turned back to the starting-point at naught, by the torsional strain upon the wire coil 36 around said shaft, one end of which is connected thereto. A stop-pin 37, Fig. 4, upon the cam, stops it at the naught-step, said coil being nominally under spring-tension, by its engagement with the plate 38, secured to the front plate and in which plate the shaft 23 has its bearing. This detent-pin 35 is secured in the weighted lever 39 pivoted upon the back plate, said lever being oscillated, as hereinafter described, to lift said detent out of said engagement, and release the ratchet and shaft to be rotated backward by said spring-coil. The units cam and wheel is locked by the weight of the arm 19, and its detent engaging with the cam-notch, although a locking mechanism like that for the tens-wheel can be applied to it if desired to have a more positive lock, and to prevent the overhang of the cam from accidentally shifting it.

*Impression mechanism*, (Fig. 3.)—A paper tape 40 is carried by the reel 41, Figs. 1 and 4, and wound onto the reel 42, being conducted through the machine adjacent to the ink-ribbon y, carried by the spools 43 and 44, secured onto the shafts 45 and 46, Fig. 2, journaled in the front and back plates, said tape and ribbon being closely adjacent to the time-wheels and number-wheels. A rock-shaft 47, Fig. 3, is journaled in the front and back plates. An arm 48 is secured to said shaft. 49 is the platen mounted upon said arm, and 50 represents a screw or screws in the rock-shaft 47, to which a coiled spring or springs 50' is connected, the other end or ends being secured to a pin 50'', projecting from the plate c, by which the force is imparted to the platen to strike its impression-blow, said blow being struck upon the printing-line and causing the hour and minute numbers upon the time-wheels and the numerals upon the number-wheels which are in alignment upon said printing-line to be printed in line across the paper tape, thus indicating the workman who operated the machine and the hour and minute when the machine was so operated.

*Platen-operating mechanism*, (Figs. 3 and 20.)—Upon the reciprocating and impression shaft 24 a collar 51 is secured, and 52 is a sleeve loose upon the shaft, to which one end of the coil-spring 53 is secured, its other end being secured to the back plate. Upon this sleeve a cam 54 is secured, projecting laterally therefrom, and upon the platen-arm a detent 55 is pivoted and provided with a leg which bears against the side of said arm, so that said detent can only rock in one direction, its outer end being provided with a cross bar or roller 56, with which the cam engages when the shaft 24 is pushed in by the hand of the operator, which forces the platen outward, and when the cam passes said push-bar the platen is released to strike its blow. Then the spring 53, being compressed by the backward movement of the shaft, forces it back again to its normal position, and as the shaft is retracted said cam strikes said detent reversely and tilts it over (to the left) so that the cam slips by over it, and the spring 58 returns the detent to its normal position ready for the next operation of the arm to actuate the platen to make the next impression. The sleeve 52 is prevented from rotation by the stud 59, secured in the cam and slidingly engaging with the pillar-post 60, connecting the front and back plates.

*Cam and wheel unlocking mechanism*, (Figs. 3 and 5.)—As shown for the tens-cam, the detent 35 on the lever 39 engages the ratchet 34 and locks this cam wherever set. In rear of the back plate, Figs. 3 and 5, a beveled collar or head 61 is secured upon the shaft 24. Upon the end of the lever 39 a beveled swing-pawl 62 is pivoted in such manner that when the shaft is pushed back the head 61 will rock said pawl and slip over it and the spring 63 will erect the pawl again behind said head, and then the retraction of the shaft will cause the head to wedge that end of said lever down, raising the detent 35 out of engagement with said ratchet and releasing the shaft 23, to be rotated backward by the coil-spring. As here shown, the units-cam is not automatically returned to the naught position; but as it is free to be shifted either way a workman can set it by turning the shaft forward or backward.

*Paper-feed mechanism*, (Figs. 3 and 15 to 20.)—Upon the rock-shaft 47 a crank-arm 64 is secured. A rod 65 is connected to it, and to a crank-arm 66 upon a rock-shaft 67 journaled in the swing-frame 68, the sides of which are pivotal upon pins (not shown) secured in the front and back plate and projecting inwardly therefrom, fitting into the holes shown at the left of the sides 68 in Figs. 16, 18, and 19, said frame sides being connected by a plate 70. The rock-shaft 67 has a limited movement, which is controlled one way by the bite of the teeth in the grip-plate 71 against the paper and said plate 70 and the other way by the stop-pin 72, so that when said rock-shaft 47 is rocked to swing the platen out, it lifts the crank-arm 64, and the rod 65 rocking the shaft 67 bringing the teeth into engagement with the paper, and then said frame is lifted, drawing the paper up, until when the rock-shaft 47 reverses, which first releases the paper from the grip and then draws the frame down to its normal position, the dotted lines in Figs. 15 and 16 showing these movements.

*Ribbon-feed mechanism,* (Figs. 3, 5, 6, 7, and 8.)—To the crank-arm 64 a bar 73 is connected, to which the feed-pawl 74 is secured, engaging with a rachet 75 in rear of the back plate, secured onto a shaft through said plate and journaled therein and in a bracket 76 secured to the back plate. The front end of this shaft carries a gear 77 in front of said plate, in engagement with a gear 78 journaled upon an arbor secured in the swing-frame 79 pivoted upon said bracket 76, said gear 78 being adapted to be swung into engagement with either of the pinions 80 81, secured upon the spool-shafts 45 and 46 respectively, to drive the shaft and spool to which the pinion in engagement is connected, as when engaged with the pinion 80 it rotates the upper spool 43 and when engaged with the gear 81 it rotates the lower spool. When the platen rock-shaft is rocked as aforesaid the swing of the crank-arm 64 will lift the pawl 74 into engagement with another tooth of the ratchet 75, and when the platen strikes its blow the bar 73 is pulled down, rotates the ratchet one tooth, and through the train of gearing rotates the wind-up spool and feeds the ribbon. This feed is reversed by swinging the gear 78 into engagement with the other pinion. Said frame is held in either position by the engagement of the pin 82 with one of the outer holes 83, and when in engagement with the central hole the ribbon is not fed because the gear 78 is not then engaged with either of the pinions 80 or 81.

An alarm mechanism is provided, comprising a hammer 84 carried by the platen, and a bell 85 mounted in proper position to receive the blow of the hammer when the platen is operated.

Upon the plate 28 an "In" and "Out" scale is mounted, and 86 is a pointer secured to a lifting-bar 87 journaled in said plate and of angular outline, so that, when rotated, its inner end will actuate the arm 88 pivoted upon the shaft 6 and swing the extension 89, so that the sign, symbol or other character thereon will be upon the printing-line, and in line with the characters upon the time and number wheels, so that the platen will then print an additional sign or character upon the paper tape, which, for instance, will indicate that the record made was that of the exit of the workman, in which case the pointer will stand at "Out." When it stands at "In" no record of this sign or symbol will be printed.

In Fig. 25 a part of a strip of paper 40 is shown, and the record thereon indicates that workman No. 48 came in at 6 o'clock and 55 minutes, went out at 11 o'clock and 59 minutes, and returned in again at 12 o'clock and 58 minutes, the star $m$ or other sign, symbol or other character used indicating by the fact of its impression appearing upon the paper that each and every record in which it appears is the record of that workman going out or leaving the shop or factory.

What I claim as my invention, and desire to secure by Letters Patent, is—

1. In a workman's time recorder, a counterbalanced workman's numeral wheel or segment mounted upon a suitable shaft or arbor, in combination with a cam mounted upon a shaft parallel to said segment shaft, and provided with stepped numeral notches complementary with the numerals on said segment and means to connect said cam to said segment whereby the rotation of the cam shaft sets said segment at any desired numeral, by shifting the plane of said connection from one step to another and rotating the segment.

2. In a workman's time recorder, a counterbalanced workman's numeral wheel or segment mounted upon a suitable shaft or arbor, in combination with a cam mounted upon a shaft parallel to said segment shaft, and provided with stepped numeral notches complementary with the numerals on said segment and means to connect said cam to said segment whereby the rotation of the cam shaft sets said segment at any desired numeral, by shifting the plane of said connection from one step to another and rotating the segment, in combination with an impression platen, a paper strip and an ink-ribbon and means to actuate said platen to strike an impression blow.

3. In a workman's time recorder, a manually rotatable number-wheel, or segment, and a vibratory impression platen, in combination with a manually operated horizontally reciprocating cam, actuating the platen to strike an impression blow.

4. In a workman's time recorder, a manually rotatable number-wheel or segment, an intermittently rotated time wheel and a vibratory impression platen, in combination with a rotatable and reciprocating shaft carrying said segment and actuated directly by the hand of the operator, and a cam thereon actuating said platen.

5. In a workman's time recorder, a rotatable number-wheel or segment, an intermittently rotated hour wheel, a continuously rotated minute wheel and a vibratory impression platen, in combination with a reciprocating shaft actuating said segment and actuated by the hand of the operator and a cam thereon, actuating said platen.

6. In a workman's time recorder, a workman's-number wheel or segment, a reciprocating shaft connected to it and adapted to be rotated to set it at any number and time wheels synchronous with a clock-movement, in combination with a vibratory impression platen, and a cam secured to and actuated by said reciprocating shaft to actuate said platen to strike a blow.

7. In a workman's time recorder, a workman's-number wheel or segment, and time wheels mounted and independently rotatable upon a shaft and a stepped cam engaging with said segment to set it at any number, in combination with a vibratory impression platen, an impression cam, whereby it is actuated, and a shaft upon which the stepped cam is mounted and said impression cam is secured and adapted to be rotated to actuate said stepped cam and to be reciprocated to actuate the impression cam.

8. In a workman's time recorder, a manually rotatable stepped cam, a rotatable number-wheel actuated thereby, an intermittently synchronous hour wheel, a continuously synchronous minute wheel, a clock connected to and actuating them, a manually operated vibratory impression platen and a cam reciprocatingly actuated to actuate the platen, in combination.

9. In a workman's time recorder, the combination with a time-wheel and workman's-number wheel of a shaft adapted to be rotated and reciprocated by independent movements, a stepped cam mounted upon and rotated by said shaft, an impression platen adapted to be vibrated to strike a blow and a cam mounted upon and reciprocated by said shaft and engaging with said platen.

10. In a workman's time recorder the combination with the time-wheels, of numeral wheels respectively indicating units, tens, &c., rotatably mounted; a separate and independently rotatable stepped cam connected to each numeral wheel whereby they are rotated and set to create workmen's numerals, an impression platen, a reciprocating shaft, and a cam thereon, whereby said platen is actuated to strike a blow by the movement of said shaft and the engagement of said cam therewith.

11. In a workman's time recorder, the combination with the time-wheels of a unit segment or wheel, a tens segment or wheel separately rotatable independently of each other and an impression platen and means to actuate it to strike an impression blow and a stepped-cam connected to each segment and rotatable to rotate and set each segment, each independently of the other, by shifting the plane of its connection to a segment by such rotation.

In witness whereof I have hereunto set my hand this 23d day of November, 1893.

WILLARD LE GRAND BUNDY.

In presence of—
  A. WARD FORD,
  HARLOW E. BUNDY.